N. K. CLEMENT.
LICENSE PLATE HOLDER FOR AUTOMOBILES.
APPLICATION FILED AUG. 16, 1912.
1,083,728.  Patented Jan. 6, 1914.
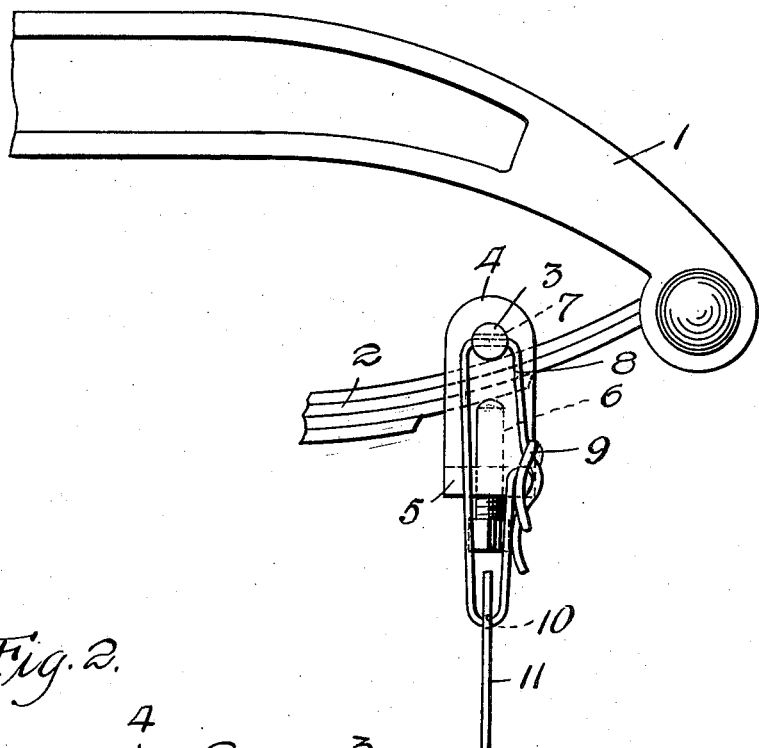
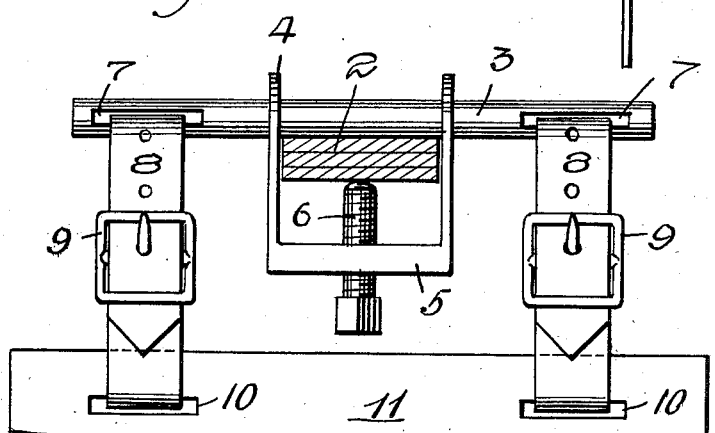
WITNESSES
INVENTOR
N. K. Clement
ATTORNEYS

UNITED STATES PATENT OFFICE.

NEWTON K. CLEMENT, OF LEECHBURG, PENNSYLVANIA.

LICENSE-PLATE HOLDER FOR AUTOMOBILES.

1,083,728.  Specification of Letters Patent.  Patented Jan. 6, 1914.

Application filed August 16, 1912.  Serial No. 715,411.

*To all whom it may concern:*

Be it known that I, NEWTON K. CLEMENT, a citizen of the United States of America, residing at Leechburg, in the county of Armstrong and State of Pennsylvania, have invented certain new and useful Improvements in License-Plate Holders for Automobiles, of which the following is a specification, reference being had therein to the accompanying drawing.

This invention relates to a license plate holder for automobiles and other vehicles, and the primary object of my invention is to provide a license holding device that can be easily and quickly clamped or mounted upon one of the leaf springs, tire case or a suitable support forming part of an automobile or vehicle, whereby the license plate or card will be safely held in a visible position.

A further object of this invention is to accomplish the above results by a holder consisting of comparatively few parts inexpensive to manufacture, easy to install and highly efficient for the purposes for which they are intended.

I attain the above objects by a mechanical construction that will be hereinafter specifically described and then claimed, and reference will now be had to the drawing, wherein:—

Figure 1 is a side elevation of a portion of a vehicle provided with the license plate holder, and, Fig. 2 is a rear elevation of the holder.

Further describing my invention in detail with reference to the drawing wherein like numerals denote corresponding parts throughout: 1 denotes a portion of the side frame of an automobile or other vehicle, said frame having attached to the front end thereof a leaf spring 2.

3 denotes a transverse supporting rod arranged upon said leaf spring, said rod extending through the apertured ends 4 of a hanger 5. The rod 3 is clamped in engagement with the spring 2 by a set screw 6, carried by said hanger and engaging the underside of said spring. The supporting rod 3 is therefore fixed relatively to the spring 2 and cannot become accidentally displaced due to vibrations or jarring of the vehicle when in motion. The ends of the supporting rod 3 are slotted, as at 7 to receive straps 8 that have buckles 9 or other fastening means for the ends of said straps. The straps 8 extend through slots 10 provided therefor in a license plate, card or holder 11. The license plate 11 is therefore suspended from the supporting rod 3 and as said supporting rod is clamped to the front portion of the automobile or vehicle, said license plate can be easily observed.

The position of the license plate does not obstruct the passage of air to a radiator nor the exhaust from a muffler, and it is thought that the utility of the holder will be apparent without further description, and while in the drawing there is illustrated a preferred embodiment of the invention, it is to be understood that the structural elements are susceptible to such changes as fall within the scope of the appended claims.

What I claim is:—

1. In combination, a supporting rod adapted to be mounted upon a portion of the vehicle and having each end provided with a slot, a license plate, means extending through said slots for suspending said plate from said rod, a hanger mounted on and depending from said rod, and means carried by the hanger and engaging the portion of the vehicle upon which said rod is mounted for clamping said rod in position.

2. In combination, a supporting rod having each end provided with a slot, a license plate, means extending through said slots for suspending said plate from said rod, a hanger mounted upon the rod, and a set screw carried by the hanger and engaging with a portion of the vehicle for binding the supporting rod thereon.

In testimony whereof I affix my signature in the presence of two witnesses.

NEWTON K. CLEMENT.

Witnesses:
MAX H. SROLOVITZ,
SAMUEL PAYNE.

Copies of this patent may be obtained for five cents each, by addressing the "Commissioner of Patents, Washington, D. C."